(12) United States Patent
Dong et al.

(10) Patent No.: US 9,130,387 B2
(45) Date of Patent: Sep. 8, 2015

(54) HYBRID INTEGRATED WIND-SOLAR-DIESEL-CITY POWER SUPPLY SYSTEM

(75) Inventors: Bin Dong, An Hui (CN); Zhong Wei Zheng, Zheng Zhou (CN); Wei Yu, ShangHai (CN); Yu Sheng Ye, An Qing (CN)

(73) Assignee: Shanghai GHREPower Green Energy Company Ltd. of P.R. China, Shanghai (CN)

( * ) Notice: Subject to any disclaimer, the term of this patent is extended or adjusted under 35 U.S.C. 154(b) by 169 days.

(21) Appl. No.: 13/520,108

(22) PCT Filed: May 27, 2011

(86) PCT No.: PCT/CN2011/074819
§ 371 (c)(1), (2), (4) Date: Jun. 29, 2012

(87) PCT Pub. No.: WO2012/055236
PCT Pub. Date: May 3, 2012

(65) Prior Publication Data
US 2013/0249298 A1    Sep. 26, 2013

(30) Foreign Application Priority Data

Oct. 29, 2010    (CN) .......................... 2010 1 0525604

(51) Int. Cl.
*H02J 3/00*    (2006.01)
*H02J 7/34*    (2006.01)
(Continued)

(52) U.S. Cl.
CPC ................. *H02J 3/005* (2013.01); *H02J 1/102* (2013.01); *H02J 7/34* (2013.01); *H02J 7/35* (2013.01);
(Continued)

(58) Field of Classification Search
CPC ......... F03D 9/002; H02J 13/0062; H02J 3/14; H02J 7/34; H02J 7/35; H02J 3/383; H02J 3/386; H02J 7/0088; H02S 10/10; Y02E 10/563; Y02E 10/566; Y02E 10/725; Y02E 10/763; Y02E 10/766; Y02E 40/72; Y04S 10/123
See application file for complete search history.

(56) References Cited

U.S. PATENT DOCUMENTS

| 6,445,600 | B2 * | 9/2002 | Ben-Yaakov ................... 363/39 |
| 2010/0264739 | A1 | 10/2010 | Errington | |
| 2011/0125336 | A1 * | 5/2011 | Groves et al. ................. 700/287 |

FOREIGN PATENT DOCUMENTS

| CN | 201323453 Y | 10/2009 |
| CN | 101814769 A | 8/2010 |

(Continued)

OTHER PUBLICATIONS

Jie Chen, Design of DC Architecture for Large-Scale Non-Grid-Connected Wind Power Generation System, 2009.*

(Continued)

*Primary Examiner* — Rexford Barnie
*Assistant Examiner* — Elim Ortiz
(74) *Attorney, Agent, or Firm* — Meagher Emanuel Laks Goldberg & Liao, LLP

(57) ABSTRACT

The invention relates to a hybrid integrated wind-solar-diesel-city power supply system, which comprises at least one subsystem selected from wind power subsystems or solar power subsystems and at least one diesel-city power subsystem, a direct-current bus unit, a main control unit, multiple high frequency rectifiers and a direct-current distribution unit. Each one subsystem has a DC output coupled to said direct-current bus unit for afflux. Said main control unit is configured to select a set of subsystems from the wind and solar power subsystems and enable the selected set of subsystems but disable others, so as to let a sum of maximum power output of all enabled subsystems to be larger than or equal to power demanded while minimize the number of the enabled subsystems contained in the selected set of the subsystems, and adjust operation of the selected subsystems so as to optimize the system efficiency, and also configured to control current and voltage output of said high frequency rectifier according to the operation status of said direct-current distribution unit and the voltage and current output of said direct-current bus unit, thereby advantageously increasing efficiency and reducing the power consumption of the system, and thus also improve reliability and life of the system apparatus.

5 Claims, 3 Drawing Sheets

(51) Int. Cl.
  *H02J 1/10*   (2006.01)
  *H02J 7/35*   (2006.01)
  *H02J 3/38*   (2006.01)

(52) U.S. Cl.
  CPC   *H02J 3/381* (2013.01); *H02J 3/383* (2013.01); *H02J 3/386* (2013.01); *Y02E 10/563* (2013.01); *Y02E 10/763* (2013.01)

(56) References Cited

FOREIGN PATENT DOCUMENTS

| CN | 201584919 | U | 9/2010 | |
| CN | 101951014 | A | 1/2011 | |
| CN | 101976986 | A | 2/2011 | |
| EP | 0959552 | A2 | 11/1999 | |
| EP | 2159895 | A2 | 3/2010 | |
| KR | 20080001828 | A | 1/2008 | |
| WO | 2009/141651 | A2 | 11/2009 | |
| WO | WO 2009141651 | A2 * | 11/2009 | H02J 7/35 |
| WO | 2012/055236 | A1 | 5/2012 | |

OTHER PUBLICATIONS

International Search Report in WO2012/055236A1.
European Patent Office Search Report, Sep. 3, 2015.
20080001828 KR English Translation Abstract.

* cited by examiner

HYBRID INTEGRATED WIND-SOLAR-DIESEL-CITY POWER SUPPLY SYSTEM

FIELD OF THE INVENTION

The present invention relates to power generation and power supply technology, particularly to a new system with clean power supply subsystems and conventional power supply subsystems integrated into a hybrid power supply system.

BACKGROUND OF THE INVENTION

In a communication base station, direct-current power supply with certain level of voltage capacity is commonly applied to various apparatus and equipments in the system. Usually, a conventional base station uses a diesel fuel generator as a backup of the city power supply in a manner of selectively switching between outputs of the city power and the diesel fuel generator and converting the power from alternating-current into direct-current in order to comply with the voltage level required by those communication apparatus. Along with the increasing problems of global energy shortage and popularity of mobile communication application, introducing new clean power supply system becomes more and more desirable. Now many base stations employ hybrid wind-solar power supply system, which uses wind generator and/or solar panels as main equipment for power supply, and uses the diesel fuel generator or the city power as a backup, such that not only the energy consumption of the whole system is reduced, but the reliability for the power supply system is also increased, therefore the communication quality can be secured.

Presently, there are mainly four types of wind-solar complementary power supply systems used in the communication technology. The first type applies a wind-solar complementary power supply system in a communication base station. This type of system converts wind power and solar power into −48V or 24V direct-current electricity and stores the electricity power into battery sets at first, and then supplies the DC electricity power to the communication base station. The second type is consisted of a wind-solar complementary power supply system, multiple inverters and multiple power switches. This type of system converts wind and solar power into direct-current electricity and also saves the electricity power into the battery sets, and then the direct-current is converted into three phase alternating-current through the inverters. The power switches are controllable to switch between two positions, a first one for charging electricity into the battery sets, a second one for supplying power to the system apparatus. The third type includes multiple wind-solar complementary power supply systems in combination with multiple power switches, and in fact, said wind-solar complementary power supply systems and said multiple power switches work independently. In a normal condition, the system is supplied by the wind-solar complementary power supply system, when the wind and solar power is insufficient, the power switch will switch on the city power or a diesel fuel generator so as to connect it with the system to supply power output therefrom. The fourth type is a hybrid wind-solar-diesel power supply system integrated with a power switch model which is managed in a centralized manner. In a normal condition, the system is supplied by the wind-solar complementary power system, which converts the wind power and solar power into direct-current of −48V or 24V. When the wind and solar power is insufficient, the power switch model will switch on the city power or a diesel fuel generator to supply power to the system.

All the above described four types of wind-solar complementary power supply systems have some disadvantages. The first type of system merely applies the wind-solar complementary power supply system for power supply, for the sake of reliability for supplying power to the system in the case of the wind and solar power resource being insufficient for a long time, there must be some battery sets with high capacity, and those battery sets must be fully discharged/charged frequently, so the life of those battery sets must be reduced and the cost of the whole system will also be increased. The second type of system employs multiple inverters for power conversion, which need a set of additional high voltage battery sets, so that the system efficiency is reduced and the cost is increased. In the third type of system, because the multiple wind-solar complementary power supply systems and the multiple power switches are working independently, there must be multiple battery control units existing, which is not advantages to the management of the battery sets, not only the system efficiency is lowered but also the overall system expenses is increased. Moreover, when the power supply systems and the power switches are working concurrently, it is quite difficult to control the charging current which may easily result in overloading of the battery sets and therefore reduce the life of the battery sets. The fourth type of system is only an simple accumulation of the wind-solar power supply system and the power switch model, although the management quality of battery sets is improved, as the system size is too big, its total expense is still high and its efficiency is still low.

Therefore, it is much desirable to develop a new type of hybrid power supply system which is an integration of new clean power supply system with the conventional power supply system, and therefore, much applicable for communication base station.

SUMMARY OF THE INVENTION

The main object of the present invention is to provide a hybrid power supply system which is as an integration of the new clean power supply system with the conventional power supply system, and which is able to maximize efficiency of use of the wind power, the solar power, the city power and the diesel fuel generator power, in order to meet normal power demand for use of the direct-current electricity power in a communication base station.

In order to achieve the above object, the present invention provides a hybrid integrated wind-solar-diesel-city power supply system, which comprises at least one subsystem selected from multiple wind power subsystems or multiple solar power subsystems and at least one diesel-city power supply subsystem, a direct-current bus unit, and a main control unit, wherein each one of said multiple wind power subsystems, said multiple solar power subsystems and said at least one diesel-city power subsystem is coupled to said direct-current bus unit for direct-current afflux, said main control unit is configured to select a set of subsystems from said multiple wind power subsystems and said multiple solar power subsystems and enable said selected set of subsystems and disable others, so as to let a sum of maximum power output of all enabled subsystems larger than or equal to power demanded while minimize the number of the enabled subsystems contained in the selected set of subsystems, said power demanded being calculated based on voltage and current output from said direct-current bus and voltage and current output from a direct-current distribution unit, said maximum power output of each one of said wind power subsystems and said solar power subsystems being calculated based on their respective operation status.

Through the above described technical solution of the hybrid integrated wind-solar-diesel-city power system of the invention, the system only selects few subsystems when the power output from the wind and solar power subsystems is relatively high but the power demanded by the downstream load is relatively low, on the other hand, the system selects most or all subsystems when the power output from the wind and solar power subsystems is relatively low but the power demanded by the load is relatively high. Therefore, not only the power consumption is reduced but also the life of the system apparatus as a whole is extended.

Advantageously, each one of the wind power subsystem comprises a wind power control unit, which includes a power convertor model, a power control model and a protective model, wherein said power control model is configured to automatically search a maximum power generated by a wind generator in its operation, so as to control the wind power subsystem to output power in a way of tracking its maximized power output, and said power control model is also configured to control said protective model according to frequency of three-phase alternating-current output from the wind generator, and direct-current and voltage output from the power convertor model.

Advantageously, each one of said solar power subsystems comprises a solar power control unit, which includes a power control model and a protection model, wherein said power control model is configured to automatically search a maximum power generated by the solar panels so as to tracking its maximized power output, and said power control model is also configured to control said protective model in response to a protection instruction received from the main control unit according to the power output from the solar panels.

Advantageously, said diesel-city power subsystem comprises a rectifier switch unit, which includes a switch model, a generator self-start model and a rectifier model which is coupled to said switch model for converting the alternating-current of the city power into the direct current. Wherein said switch model is configured to selectively switch on or off said diesel fuel generator and the city power into connection with or disconnection from the hybrid power supply system in response to switching instruction received from the main control unit according to the status of the city power, the diesel fuel generator and batteries, said self-start model for the diesel fuel generator is configured to selectively turn on or off the diesel fuel generator in response to instruction received from said switch model.

Advantageously, at least one high frequency rectifier is further provided between said direct-current bus unit and said direct-current distribution unit. Said direct-current distribution unit includes at least one set of batteries. Said main control unit is configured to control voltage and current output from said high frequency rectifier according to the operation status of said direct-current distribution unit and output voltage and current of said direct-current bus unit and the battery sets. Moreover, the power supply for the primary load is continuously by multiplexing multiple high frequency rectifiers, thereby reducing the number of battery sets needed in the system so as to reduce the system expenses greatly.

Overall, the present invention advantageously integrates the wind power, the solar power, the diesel-city power subsystems into a hybrid power supply system, and employs a centralized main control unit for controlling all distributed power control units of corresponding subsystems, thereby increasing the efficiency and reliability of the whole system. Moreover, since the wind power subsystems and solar power subsystems are controlled separately to adjust their efficiency and to tracking their respective maximum power, therefore a balance between efficiency optimization for the whole system and separate control of each power control unit of the subsystem is realized.

DETAILED DESCRIPTION

The invention will now be illustrated though the following detailed description of embodiments in a way of example only.

Figure 1:
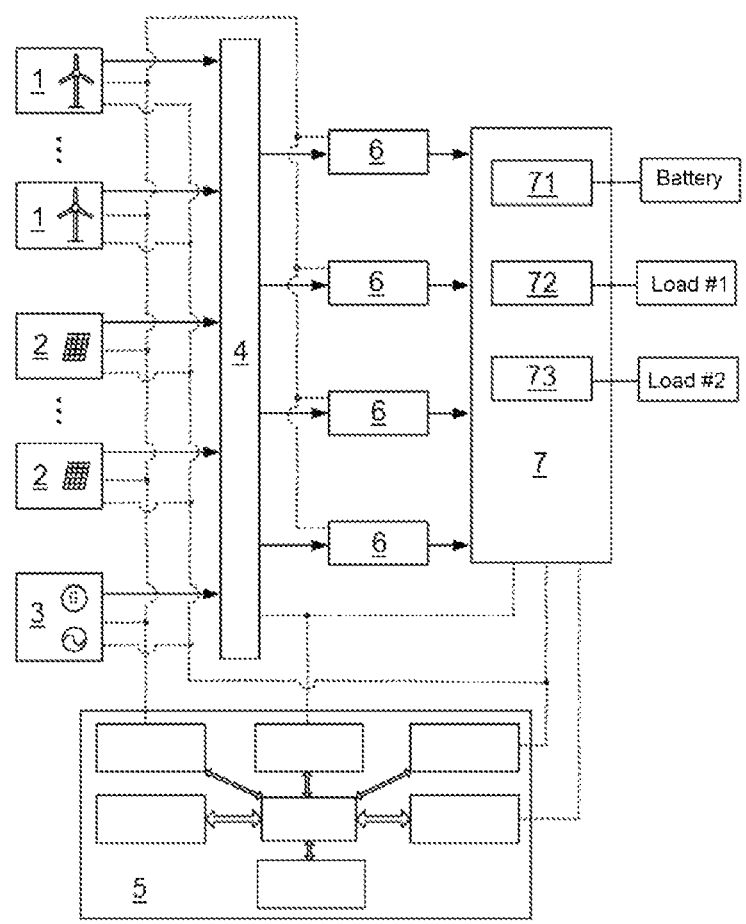
FIG. 1 is a structural block diagram showing a hybrid integrated wind-solar-diesel-city power supply system according to the present invention.

As shown in FIG. 1, the present invention provides a hybrid integrated wind-solar-diesel-city power supply system which is applicable in a communication base. This hybrid power supply system embodiment of the invention as shown in FIG. 1 mainly comprises multiple wind power subsystems 1, multiple solar power subsystems 2, a diesel-city power subsystem 3, a direct-current bus unit 4, a main control unit 5, multiple high frequency rectifiers 6 and a direct-current distribution unit 7.

Figure 2:
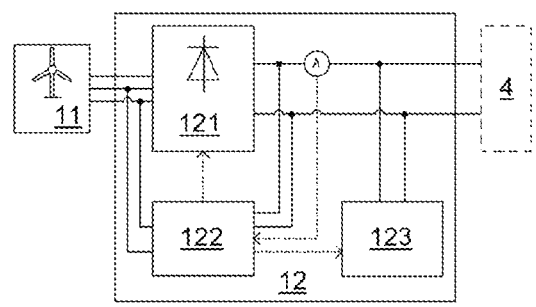
FIG. 2 is a schematic block diagram showing a wind power subsystem of the hybrid integrated wind-solar-diesel-city power supply system according to the present invention.

FIG. 2 is a schematic diagram showing the wind power subsystem 1 of the hybrid power supply system according to the present invention. Each one of said wind power subsystems 1 comprises a wind generator 11 and a wind power control unit 12. Said wind generator 11 has an alternating-current output port thereof coupled to an input of said wind power control unit 12, and then a direct-current output of said wind power control unit 12 is coupled to said direct-current bus unit 4.

Figure 3:
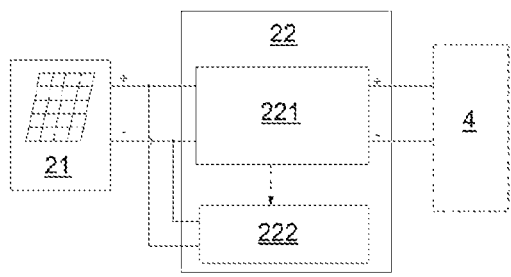
FIG. 3 is a schematic block diagram showing a solar power subsystem of the hybrid integrated wind-solar-diesel-city power supply system according to the present invention.

FIG. 3 is a schematic diagram showing the solar power subsystem 2 of the hybrid power system according to the present invention. Each one of said solar power subsystem 2 comprises a set of solar panels 21 and a solar power control unit 22. Each set of solar panels 21 has a direct-current output thereof coupled to an input of said solar power control unit 22, and a direct-current output of said solar power control unit 22 is then coupled to said direct-current bus unit 4.

Figure 4:
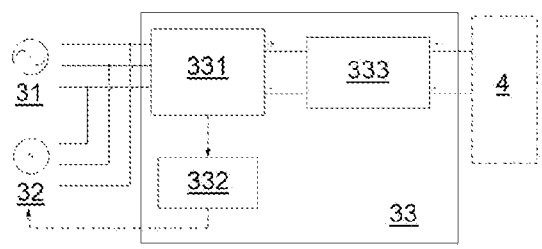
FIG. 4 is a schematic block diagram showing a diesel-city power subsystem of the hybrid integrated wind-solar-diesel-city power supply system according to the present invention.

FIG. 4 is a schematic diagram showing the diesel-city power subsystem 3 of the hybrid power system according to the present invention. Said diesel-city power subsystem 3 comprises an input of city power 31, a diesel fuel generator 32 and a rectifier switch unit 33. The city power supply 31 and the diesel fuel generator 32 have their respective alternating-current output coupled to alternating-current inputs of said rectifier switch unit 33. The diesel fuel generator 32 is provided with a control signal input port in communication connection with a control signal output port of said rectifier switch unit 33 for controlling self-start of said diesel fuel generator 32. Said rectifier switch unit 33 has a direct-current output coupled to said direct bus unit 4.

As it can be seen in FIG. 1, said wind power subsystem 1, said solar power subsystem 2 and said diesel-city power subsystem 3 are respectively coupled to said direct-current bus unit 4 for direct-current afflux. Said multiple high frequency rectifiers 6 have input ports thereof coupled to the output of said direct-current bus unit 4, and outputs thereof coupled to the direct-current distribution unit 7.

Said direct-current distribution unit 7 comprises a battery management model 71 for managing battery sets, a primary load management model 72 for managing primary load and a secondary load management model 73 for managing secondary load. Said battery management model 71 has an input coupled to a corresponding output of said high frequency rectifier 6 and an output coupled to a set of batteries. Said primary load management model 72 and secondary load management model 73 have inputs thereof respectively coupled to corresponding outputs of the high frequency rectifiers 6 and have outputs thereof respectively coupled to power supply inputs of external system apparatus.

Now still as referred to FIG. 2, the wind power control unit 12 of the wind power subsystem 1 of the hybrid power supply system in the present invention comprises a power convertor model 121, a power control model 122 and a protective model 123. Said power convertor model 121 has an input thereof coupled to an alternating-current output of the wind generator 11, and an output thereof coupled to an input of said protective model 123 and an input of said direct-current bus unit 4. Said power control model 122 is provided with data input ports in communication connection with input and output of said power convertor model 121 for data sampling, and further provided with control signal output ports in communication connection with said power convertor model 121 and said protective model 123. Said power control model 122 detects and calculates rotation speed and output power of the wind generator 11, based on which said main control unit 5 send its control signal to said power convertor model 121 and said protective model 123.

As referred to FIG. 3, the solar power control unit 22 of the solar power subsystem 2 of the hybrid power supply system of the present invention comprises a power control model 221 and a protective model 222. Said power control model 221 has an input thereof coupled to an output of said solar panels 21, and an output thereof coupled to said direct-current bus unit 4. Said power control model 221 is further provided with a control signal output port in communication connection with said protective model 222. Said power control model 221 detects and calculates output voltage and output current, based on which said main control unit 5 send its control signal to said protective model 222.

As referred to FIG. 4, the diesel-city power subsystem 3 comprises a rectifier switch unit 33, which includes a switch model 331, a generator self-start model 332 and a rectifier model 333 for converting alternating-current into direct-current. Said switch model 331 is configured to turn on or off the city power supply 31 and diesel fuel generator 32 into connection with the system either manually or automatically according to a switching instruction received from the main control unit 5 based on operation status of the city power 31, the diesel fuel generator 32 and the battery sets. Said generator self-start model 332 is configured to start up or shut down the diesel fuel generator 32 in response to a control instruction received from said switch model 331.

Figure 5:
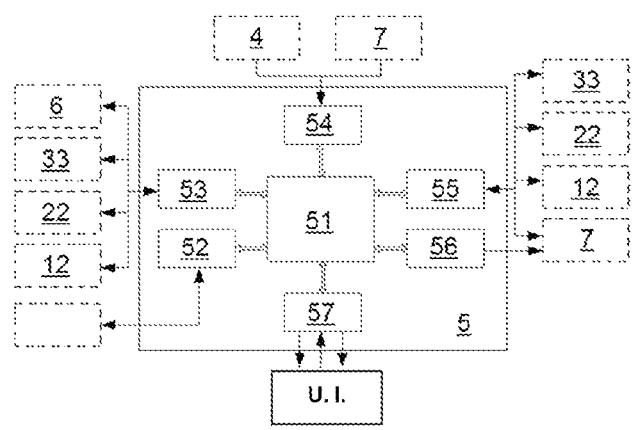
FIG. 5 is a block diagram showing a main control unit of the hybrid integrated wind-solar-diesel-city power supply system according to the present invention.

As referred to FIG. 5, said main control unit 5 of the hybrid power supply system of the present invention comprises a main processor 51, an upstream communication model 52, a downstream communication model 53, a data sampling model 54, a node management model 55, a load management model 56 and a user interface model 57.

Said upstream communication model 52 has one port in connection with a communication port of an external upstream device, and another port in connection with said main processor 51, so as to perform communication between the main processor 51 and said external upstream devices. Said downstream communication model 53 has one port connected with said wind power control unit 12, said solar power control unit 22, said rectifier switch unit 33 and said high frequency rectifier 6 at their communication ports, and another port connected with the main processor 51, so as to connect the main processor 51 in communication connection with all these models. Said data sampling model 54 has input ports connected to said direct bus unit 4 and said direct distribution unit 7 respectively. Said node management model 55 has input ports respectively connected to said multiple wind power control units 12, said multiple solar power control units 22, said rectifier switch model 33 and said direct distribution unit 7 at their node signal ports so as to detect node signal at those ports, and has output ports respectively connected to said main processor 51 to control output nodes. Said load management model 56 has an output port connected to said direct-current distribution unit 7 and an input port connected to said main processor 51 for performing management of the load. Said human-computer user interface model 57 has one port connected to a LCD display, a keyboard and an indicator, and another port connected to said main processor 51, so as to perform communication interaction between the user and the computer.

A first type of input signal received by said main control unit 5 through the downstream communication model 53 includes signals sent from respective wind power control units 12, solar power control units 22, rectifier switch model 33 and high frequency models 6. A second type of input is received by said main control unit 5 through the data sampling model 54, which includes data detected from said direct-current bus unit 4 and said direct-current distribution unit 7. A first type of output signal sent from said main control unit 5 includes instructions sent via the load management model 56 to said direct distribution unit 7. A second type of output signal sent from said main control unit 5 includes control signals sent to said wind power control unit 12, said solar power control unit 22, rectifier switch model 33 and direct-current distribution unit 7 though the node management model 54.

The hybrid integrated wind-solar-diesel-city power supply system according to the present invention works in a manner as follows:

The wind generator 11 converts wind power captured into three phase alternating-current electricity power, which is transmitted to the wind power control unit 12 and converted into high voltage direct-current electricity power by the power convertor model 121, and then transmitted to the direct-current bus unit 4. The power control model 122 is configured to control operation of the power convertor model 121 as a function of rotation speed and output voltage and current of the wind generator 11, so as to always maintain the wind generator 11 to work at a maximum power point. When the wind generator 11 is over speed, its output voltage and output current exceed a predefined threshold, or based on current restriction command sent from the main control unit 5, the power control model 122 will send instructions to the protective model 123 to adjust the operation status of the wind generator 11 by means of electronic loading or limit protection in order to protect downstream apparatus.

The solar panels 21 converts solar power into high voltage direct-current electricity power, which is firstly transmitted to the solar power control unit 22, and then transmitted to the direct-current bus unit 4 subject to an adjustment performed by the power control model 221 of the solar power control unit 22 in a way of tracking the maximized power output. The power control model 221 is configured to control the operation of the protective model 222 according to the power output and the protection command received from the main control unit 5.

The multiple high frequency rectifiers 6 have input ports thereof respectively coupled to the direct-current bus unit 4. The high voltage direct-current power output from the wind power control units 12, the solar power control units 22 and the rectifier switch model 33 is converted into direct-current power, such as −48V or 24V direct-current power, and then transmitted to the direct-current distribution unit 7.

The direct-current distribution unit 7 is intended to distribute electricity power output from the high frequency rectifiers 6 in order to supply the distributed power to the respective downstream loads and store the energy into the battery sets.

An amount of power demanded by the system can be calculated in the main control unit 5 by using data, such as output voltage and current of the direct bus unit 4 and the direct distribution unit 7 detected by the data sampling model 54. Based on the operation status of each one of the wind power subsystems 1 and the solar power subsystems 2, speed-power curves and voltage-current characteristic curves with regard to respective subsystems can be derived by using the information received through the communication ports, and their respective maximum output power can be thus calculated. Next, the main control unit 5 is configured to select one set of subsystems from the multiple wind power subsystems and the multiple solar power subsystems, and enables the selected set of subsystems while disenable the others, so as to let a sum of the maximum output power of all enabled subsystems larger than or equal to the power demanded by the system while the number of enabled subsystems contained in said selected and enabled set of subsystems is minimized. The main control unit 5 is also configured to operatively control the on-off and resume status of each subsystem, and adjust operation parameters of all selected subsystems so as to optimize efficiency of the enabled subsystems in operation. Said operation parameters include but not limited to output current, output voltage, input current, input voltage, protective current, protective voltage, and/or response speed to any changes, etc. In the case that there is no such one set of subsystems in line with the above conditions existing, the city power 31 of the diesel-city power subsystem 3 is preferably turned on operation to supply power to the hybrid power supply system in a first priority. If the city power 31 is failure, then the diesel fuel generator 32 is started up to supply power to the hybrid power supply system, in this case, the data sampling model 54 of the main control unit 5 detects operation status of the direct-current distribution unit 7 and the output voltage and current of the direct-current bus unit 4, thereby the output voltage and current of the high frequency rectifiers 6 is controlled as a function of the power demanded by the primary and secondary load and the battery sets.

When the wind and solar power resource is not enough, and the potential of the battery is too low, the main control unit 5 will send a command to the rectifier switching model 33 to start up a back up power supply. Firstly, the rectifier switching model 33 will automatically detect the current status of the city power 31, if the city power 31 exists, the main control unit 5 will send a command to the switching model 331 to switch the city power 31 into the system, if the city power 31 is failure, the main control unit 5 will send a command to the self-start up model 332 to start up the diesel fuel generator 32 and then switch the diesel fuel generator 32 into the system at the same time.

When the alternating-current city power is switched into the system, the alternating-current power is rectified by the rectifier model 333 of the rectifier switching model 33 and converted into the direct-current power, which is then transmitted to the direct-current bus unit 4. Given the multiple high frequency rectifiers 6 are all coupled with the direct-current bus unit 4, the power output after being rectified in the rectifier model 333 is preferably converted into −48V or 24V direct-current power immediately without a need of additional high frequency rectifier models 6.

Any one of the wind power, the solar power, the city power and the diesel fuel generator power subsystems is controlled by a same main control unit 5, and the power output of the same is converted by one common set of high frequency rectifier models 6, and then transmitted into a same direct-current distribution unit 7. Thus, it is possible to optimize the efficiency of the whole system, while a number of management units corresponding to same number of battery sets can be avoided, and then the system reliability can be improved.

The hybrid power supply system according to the present invention has following advantages:

1) The wind power, the solar power, and the diesel-city power subsystems as individual power supply subsystems are integrated into one hybrid power supply system with distributed control units respectively provided at corresponding subsystems but only one centralized management for controlling multiple subsystems including multiple wind power generators and/or multiple solar panels through the direct-current bus unit and the main control unit, thereby increasing the reliability of the whole system.

2) Through the controlling and tracking of the maximized power of the wind power subsystems and the solar power subsystems separately, each one of the wind generators and each one set of the solar panels are ensured to reach their optimized efficiency respectively, while the optimization of the efficiency of the whole system and each individual power control unit is also balanced through the fine control of the main control unit.

3) The management of the battery sets is also improved through the integration of this hybrid power supply system of the invention, because multiple devices for controlling multiple battery sets are avoided, so that the battery over-charging and over-discharging are avoided, and then the quality and the life of the battery sets are improved.

4) By multiplexing the high frequency rectifiers, the total number of the power convertor models needed in the system is reduced, therefore the system reliability is improved while the system cost is greatly lowered. Meanwhile, by using the rectifier switching module, the system is able to start the backup power supply subsystem without any delay, the continuity of the system power supplying is secured. And, there is no such a need to provide the system with a large number of battery sets, therefore the system cost is also reduced.

5) The system as a whole is not only energy saving but also with an extended life for use, since the main control unit is configured to select and enable only part of subsystems, e.g. only few subsystems are selected when the power output of the wind and solar power subsystems is relatively high but the power demanded by the load is relatively low, else, most or all of subsystems are selected when the power output of the wind and solar power subsystems is relatively low but the power demanded by the load is relatively high.

Although the foregoing examples which have already been illustrated as preferred embodiments of present invention, those people who are skilled in the art may better understand that any possible changes, modifications and amendments for carrying out the same purpose of the present invention are readily perceivable under the teaching of this invention. And those skilled in the art should also realize that any equivalents without apart from the spirit and concept of this invention still fall into the protection scope of the invention as defined in the appended claims.

The invention claimed:

1. A hybrid integrated wind-solar-diesel-city power supply system comprising
    multiple wind power subsystems, each one of which comprises a wind generator and a power control model, wherein said wind power control model includes a power convertor model for converting alternating-current output from a wind generator into direct-current, and a power control model, which is configured to automatically search a maximum power generated by a wind generator in its operation, so as to control the wind power subsystem to output power in a way of tracking its maximized power output;
    multiple solar power subsystems, each one of which comprises solar panels and a solar power control unit, wherein said solar power control unit includes a power control model, which is configured to automatically search a maximum power generated by solar panels in operation so as to tracking its maximized power output;
    at least one diesel-city power subsystem, which comprise a city power supply, a diesel fuel generator and a rectifier switch unit, wherein said rectifier switch unit includes a switch model, a generator self-start model and a rectifier model, said switch model being configured to selectively switch on or off the diesel fuel generator and the city power to connect with or disconnected from the hybrid power supply system, said rectifier model being configured to convert the alternating-current of the city power supply into the direct-current;
    a direct-current bus unit, said wind power subsystems and said solar power subsystems and said at least one diesel-city power subsystem being coupled to said direct-current bus unit for direct-current afflux;
    a main control unit;
    multiple high frequency rectifiers; and
    a direct-current distribution unit, which includes at least one set of batteries; wherein
    said multiple high frequency rectifiers are multiplexedly connected with the output of said direct-current bus unit and the input of said direct-current distribution unit; and
    said main control unit is configured to select a set of subsystems from said multiple wind power subsystems and enable said selected set of subsystems and disable others, so as to let a sum of maximum power output of all enabled subsystems to be larger than or equal to power demanded while minimize number of the enabled subsystems contained in the selected set of subsystems, said power demanded being calculated based on voltage and current output of said direct-current bus and voltage and current output of a direct-current distribution unit, said maximum power output of each one of said wind power subsystems and said solar power subsystems being calculated based on their respective operation status.

2. The hybrid integrated wind-solar-diesel-city power supply system as claimed in claim 1,
    wherein said main control unit is configured to control the on-off status and resume of each selected subsystem, and adjust operation of said selected subsystems by changing their operation parameters in order to optimize their operation efficiency, wherein said operation parameters include but not limited to current output, voltage output, current input, voltage input, protective current, protective voltage, and speed of response to any changes in the adjustment.

3. The hybrid integrated wind-solar-diesel-city power supply system as claimed in claim 1,
    wherein said wind power control unit further includes a protective model, said power control model being configured to control said protective model by means of electronic load and restriction protection short circuit in order to protect the wind generator and its downstream apparatus in response to a protection instruction received from said main control unit according to frequency of three-phase alternating-current output from the wind generator, and direct-current and voltage output from the power convertor model.

4. The hybrid integrated wind-solar-diesel-city power supply system as claimed in claim 1,
    wherein said solar power control unit further includes a protective model coupled to said power control model, which is configured to control said protective model in response to a protection instruction received from said main control unit according to the power output from the solar panels.

5. The hybrid integrated wind-solar-diesel-city power supply system as claimed in claim 1,
    wherein said diesel-city power subsystem comprises a rectifier switch unit,
    wherein said rectifier switch unit includes a switch model and a generator self-start model, said switch model being configured to be operable either manually or in response to an on-off instruction received from the main control unit according to the status of the city power, the diesel fuel generator and batteries, to selectively switch on or off the diesel fuel generator and the city power to connect with or disconnected from the hybrid power supply system, said generator self-start model being configured to selectively turn on or off the diesel fuel generator in response to an instruction received from said switch model.

* * * * *